(12) United States Patent
Benthien

(10) Patent No.: US 9,139,282 B2
(45) Date of Patent: Sep. 22, 2015

(54) FASTENING ARRANGEMENT FOR ATTACHING A FLOOR

(71) Applicant: Airbus Operations GmbH, Hamburg (DE)

(72) Inventor: Hermann Benthien, Sottrum (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 30 days.

(21) Appl. No.: 14/055,948

(22) Filed: Oct. 17, 2013

(65) Prior Publication Data

US 2014/0131519 A1  May 15, 2014

Related U.S. Application Data

(60) Provisional application No. 61/726,058, filed on Nov. 14, 2012.

(30) Foreign Application Priority Data

Nov. 14, 2012 (EP) .................................... 12192659

(51) Int. Cl.
*B64C 1/18* (2006.01)
*F16B 35/06* (2006.01)

(52) U.S. Cl.
CPC .. *B64C 1/18* (2013.01); *F16B 35/06* (2013.01)

(58) Field of Classification Search
CPC .................................. B64C 1/18; F16B 35/06
USPC ........ 244/131, 119, 121, 118.1, 118.5, 118.6, 244/129.1, 117 R
See application file for complete search history.

(56) References Cited

U.S. PATENT DOCUMENTS

| | | | | |
|---|---|---|---|---|
| 4,479,621 A | * | 10/1984 | Bergholz | ................... 244/117 R |
| 5,501,289 A | * | 3/1996 | Nishikawa et al. | .......... 180/68.5 |
| 6,068,214 A | * | 5/2000 | Kook et al. | ................. 244/118.1 |
| 7,462,006 B2 | | 12/2008 | Benthien | |
| 8,366,041 B2 | | 2/2013 | Ricaud et al. | |
| 8,382,038 B2 | | 2/2013 | Benthien | |
| 8,523,109 B2 | | 9/2013 | Demont et al. | |
| 2005/0109877 A1 | * | 5/2005 | Williamson et al. | ....... 244/118.1 |
| 2005/0211844 A1 | * | 9/2005 | Ricaud | ....................... 244/122 R |

(Continued)

FOREIGN PATENT DOCUMENTS

DE  202005019615 U1  4/2006

OTHER PUBLICATIONS

European Searching Authority, European Search Report for 12192659.6 Mailed May 16, 2013.

*Primary Examiner* — Elizabeth A Plummer
(74) *Attorney, Agent, or Firm* — Ingrassia Fisher & Lorenz, P.C.

(57) ABSTRACT

A fastening arrangement for attaching a floor to a support structure is provided. The arrangement includes across beam, a floor panel deposited on the cross beam, a fork bolt attached to the cross beam via a barrel nut, and a lug bolt rotary connected to the fork bolt for attaching an attachment element to the cross beam. The fork bolt has a head for accommodating an end of the lug bolt. The fork bolt has a foot with a thread to be screwed into a thread of the barrel nut. The floor panel has an opening for accommodating the head of the fork bolt, such that the floor panel is attached to the cross beam by the fork bolt. The head of the fork bolt is rotatable in the opening of the floor panel for screwing the fork bolt into the barrel nut by rotating the lug bolt.

20 Claims, 14 Drawing Sheets

(56) References Cited

U.S. PATENT DOCUMENTS

| | | |
|---|---|---|
| 2009/0252917 A1 | 10/2009 | Weber et al. |
| 2010/0038486 A1* | 2/2010 | Benthien et al. ............ 244/119 |
| 2010/0230544 A1* | 9/2010 | Huber et al. ................. 244/131 |
| 2010/0294884 A1* | 11/2010 | Benthien et al. ........... 244/118.1 |
| 2011/0001006 A1* | 1/2011 | Delahaye et al. .......... 244/118.5 |

* cited by examiner

FASTENING ARRANGEMENT FOR ATTACHING A FLOOR

CROSS-REFERENCE TO RELATED APPLICATIONS

This application claims priority to European Patent Application No. 12 192 659.6, filed Nov. 14, 2012, and to U.S. Provisional Patent Application No. 61/726,058, filed Nov. 14, 2012, which are each incorporated herein by reference in their entirety.

TECHNICAL FIELD

This application pertains to a fastening arrangement for attaching a floor to a support structure and to an aircraft.

BACKGROUND

Seats, galleys, monuments and tie downs in an aircraft usually are connected to the aircraft via seat rails that extend in a longitudinal direction (i.e. X-direction) through the aircraft and that are attached to cross beams, which extend in a transverse direction (i.e. Y-direction) to stabilize frames that surround the aircraft and which may be supported by vertical struts.

The struts, crossbeams, frames, ribs, stringers, floor and the skin of the aircraft are part of a so-called primary structure, which provides the elements for stiffing the overall structure of the aircraft. For example, the cross beams reinforces the frame against inner pressure which leads to tension stresses and classifies it as a primary structure part. The floor creates the shear stiffness for the fuselage. For example, together with the other parts of the primary structure, the cross beams are tested under the full fatigue spectra in the major fatigue test.

Other elements of the aircraft, such as, for example, lashing brackets are part of a so-called secondary structure and are also used to install the equipment like seats, monuments, galleys, toilets, etc. The floor may work like a big shear web, which may distribute all equipment loads in flight direction directly over its side attachment to the skin. The distribution of the loads may be driven by stiffness. Usually, the seat rails are used for mechanically decoupling the secondary structure from the primary structure. The seat rails may be seen as load distribution elements for seat loads into the floor panels.

U.S. Pat. No. 7,462,006 A1 and DE 10 2007 011 611 A1 show a fastening arrangement for lashing brackets in the floor of a cargo hold of an aircraft. The connection between a lashing bracket and a frame of the aircraft is performed with two half-barrel nuts.

Other objects, desirable features and characteristics will become apparent from the subsequent summary and detailed description, and the appended claims, taken in conjunction with the accompanying drawings and this background.

SUMMARY

According to various exemplary embodiments, provided is a fastening arrangement that simplifies the structure of an aircraft, saves weight in an aircraft and enlarges the usable space inside an aircraft.

One of various aspects of the present disclosure relates to a fastening arrangement for attaching a floor to a support structure. The support structure may be the frame of a vehicle or an aircraft. The floor may be a floor of a cabin of the vehicle or the aircraft. The fastening arrangement may be further used for attaching an element of the secondary structure of the vehicle (such as a seat, a seat row, a galley, a monument, a toilet, a chain and/or rope) to the primary structure of the vehicle (comprising the cross beam).

According to an embodiment of the present disclosure, the fastening arrangement comprises at least one cross beam, which may be attached sidewards to the frame and/or to a skin of the support structure; a floor panel of the floor deposited on the at least one cross beam; a fork bolt attached to the cross beam via a barrel nut; and a lug bolt rotary connected to the fork bolt and adapted for attaching an attachment element to the cross beam.

The fork bolt has a head with a slit for accommodating an end of the lug bolt, such that the lug bolt is rotary and/or hinge able in the direction of the slit. For example, the head of the fork bolt may receive a fastening bolt that provides a hinge axis and the lug bolt has an eye that receives the fastening bolt.

The fork bolt has a foot with a thread to be screwed into a thread of the barrel nut. The barrel nut may be accommodated in an opening in the cross beam and may provide an inner thread into which the thread of the fork bolt may be screwed.

The floor panel has an opening for accommodating the head of the fork bolt, such that the floor panel is attached to the cross beam by the head of the fork bolt. For example, an insert in the floor panel may provide the opening in the floor panel and a bottom wall of the insert is clamped between the head of the fork bolt and the cross beam.

The head of the fork bolt is rotatable in the opening of the floor panel for screwing the fork bolt into the barrel nut by rotating the lug bolt. For example, the head may have an outer profile that is rotatable in the opening in the floor panel.

In such a way, the fastening attachment fastens the floor panel to the cross beam and may be used for attaching further elements to the floor and/or the cross beam. With the fastening arrangement no seat rails are necessary any more to attach or fasten seats and monuments and the like, for example to an aircraft. In such a way, weight and space may be saved. In combination with a two-piece barrel nut (see below) this solution may also be used as a rotatable tie down.

The lug bolt and the fork bolt may form a hinge that may mechanically decouple an element of the primary structure from the cross beam and/or the secondary structure in such a way that a bending movement free load introduction into the intersection of the neutral fibres of cross beam and/or the floor is possible. The load in the flight direction may be only introduced in the floor panel. Furthermore, the cross beam may be designed as a resilient member, thus making the cross beam to a load introduction element into the frame.

According to one exemplary embodiment of the present disclosure, the lug bolt comprises an end with a thread opposite to an end attached to the fork bolt. The thread is adapted for attaching the attachment element to the lug bolt. Additionally or alternatively, the lug bolt comprises an end with a snap-and-click connection for attaching the attachment element to the lug bolt. In a first step, the lug bolt may be used for screwing the fork bolt into the barrel nut in the cross beam. In a second step, the attachment element may be screwed and/or sticked (snap & click) to the lug bolt.

According to an embodiment of the present disclosure, the fastening arrangement comprises further an attachment element with a thread that may be attached to the thread of the lug bolt. The thread of the attachment element may be threaded in the opposite direction of the thread of the lug bolt, such that the attachment element may be fastened to the lug bolt with a bushing having one inner thread. In such a way, a very simple bushing may be used.

According to an exemplary embodiment of the present disclosure, the lug bolt comprises an end that is hinge able rotary into the opening of the floor panel. In such a way, a flat floor may be created by hiding the lug bolt in the opening.

According to an embodiment of the present disclosure, the lug bolt comprises a wrench engagement section for engaging a wrench, such that the fork bolt is screw able into the barrel nut with a wrench engaging with the wrench engagement section. Also the attachment element and the bushing may comprise such wrench engagement section, which may be, for example, hexagonal nuts.

According to another embodiment of the present disclosure, the head of the fork bolt comprises an outer profile that fits into an inner profile of the opening in the floor panel such that the head of the fork bolt is adapted for transferring a force acting on the head to the inner profile of the opening. For example, the head of the fork bolt may be plugged into the opening such that at least parts of the outer profile touch the inner profile of the opening. In such a way, forces or loads acting in a horizontal direction (such as the X-direction or the Y-direction) may be introduced into the floor panel.

In this way, a deep load introduction point may be provided to avoid large sideward forces. The bending stiffness of the floor panel and/or a torsion stiffness of the cross beam may be reduced.

According to an exemplary embodiment of the present disclosure, the opening in the floor panel has a circular inner profile and the head of the fork bolt has an at least partially circular outer profile. With these profiles, the head and the opening may touch each other in a relative large area, while the head may be rotated in the opening for attaching the floor to the cross beam.

According to an embodiment of the present disclosure, an upper surface of the fork bolt is substantially flush with an upper surface of the floor panel. In this context, substantially flush may mean that the head of the fork bolt is nearly completely accommodated in the opening in the floor panel.

According to one embodiment of the present disclosure, the fastening arrangement may further comprise a fastening bolt for rotary attaching the lug bolt to the fork bolt. For example, the lug bolt may comprise an eye to be accommodated in the slit of the head of the fork bolt, which eye has an opening for accommodating the fastening bolt. The arrangement of fork bolt, lug bolt and fastening bolt may be assembled before it is plugged into the opening in the floor panel. In particular, the fork bolt, the lug bolt and the fastening bolt may be easily disconnected from each other.

According to an embodiment of the present disclosure, the fastening bolt has a head that, when the fastening bolt is plugged into the head of the fork bolt, completes the outer profile of the fork bolt to a circular outer profile. For example, the head of the fork bolt may have a flat side wall that may be used for positioning the fastening bolt in that the head of the fastening bolt rests on the flat side wall. The head of the fastening bolt may have the shape of a cylinder segment that completes a partially cylindrical outer profile of the head of the fork bolt.

According to another exemplary embodiment of the present disclosure, a hinge axis between the fork bolt and the lug bolt is between an upper surface of the floor panel and a lower surface of the floor panel. Usually the hinge axis may run orthogonal to the longitudinal direction of the vehicle or the aircraft (i.e. in the Y-direction). In this case, forces or loads acting on the lug bolt in the longitudinal direction may then be transferred moment-free or nearly moment-free into the floor panel.

According to an embodiment of the present disclosure, the opening in the floor panel is provided by a first cup-shaped insert which is inserted into an opening or hole in the material of the floor panel. The cup-shaped insert may have an inner profile adapted for accommodating the head of the fork bolt. For example, the cup-shaped insert may comprise a side wall that has the same height as the material of the floor panel and a bottom wall parallel to a lower surface of the floor panel. The bottom wall may have a hole through which the foot of the fork bolt may be plugged.

According to an embodiment of the present disclosure, the above mentioned insert is a first insert and the floor panel comprises a second cup-shaped insert for accommodating the first cup-shaped insert. In such way, a grounding or basis (comprising the inserts) of the fastening arrangement in the floor panel may be provided by plugging the second, for example, lower, insert into the opening in the material of the floor panel and by plugging the first, for example, upper insert into the second insert.

According to another exemplary embodiment of the present disclosure, the first and/or second cup-shaped insert has a bottom that is substantially flush with a lower surface of the floor panel. The bottom wall may have a hole or opening through which the foot of the fork bolt may be guided.

According to an embodiment of the present disclosure, the first cup-shaped insert has a flange that surrounds the first cup-shaped insert and that covers a part of the material of the floor panel. For example, the flange may be used for stiffing the insert and/or for bonding the insert to the floor panel. The flange may be on the opposite side of the insert as the bottom wall of the insert.

According to an embodiment of the present disclosure, the second cup-shaped insert has a flange that surrounds the second cup-shaped insert and that covers a part of the material of the floor panel. Also this flange may be used for stiffing the insert and/or for bonding the insert to the floor panel. The flange of the second cup-shaped insert may be flush with the bottom wall of the insert.

According to one embodiment of the present disclosure, the cross beam has an opening for accommodating the barrel nut, and a hole for accommodating the foot of the fork bolt. The two openings may be substantially orthogonal to each other.

According to an embodiment of the present disclosure, the opening in the cross beam for the barrel nut is situated at a neutral fibre of the cross beam. In such a way, the barrel nut may be designed less massive, since at the neutral fibre there is only less deformation of the opening.

According to another embodiment of the present disclosure, the barrel nut is a one-piece member, which may half the form of a half-cylinder and which may have the inner thread for attaching the fork bolt.

According to an embodiment of the present disclosure, the barrel nut has a first or upper part fitting into an opening in the cross-beam and a second part or lower part with the thread for attaching the fork bolt. The barrel nut may be a two-piece member and may be seen as a modified barrel nut. The first part may have the same outer form as the one-piece barrel nut without a thread. The second part may be a nut with a thread. The first part and second part may be adapted to be plugged into each other. For example, the second part may be a nut with a half ball shape and a spigot on the top which can be pushed in the first part.

The thread of the barrel nut may be self locking.

Another one of various aspects of the present disclosure relates to an aircraft, wherein the aircraft comprises a plurality of cross beams, a floor deposited on the cross beams and a plurality of fastening arrangements as described in the above and in the following for attaching the floor to the cross beams. The fastening arrangements may be used for attaching elements or members of the secondary structure to the floor and the cross beams and/or the primary structure of the aircraft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
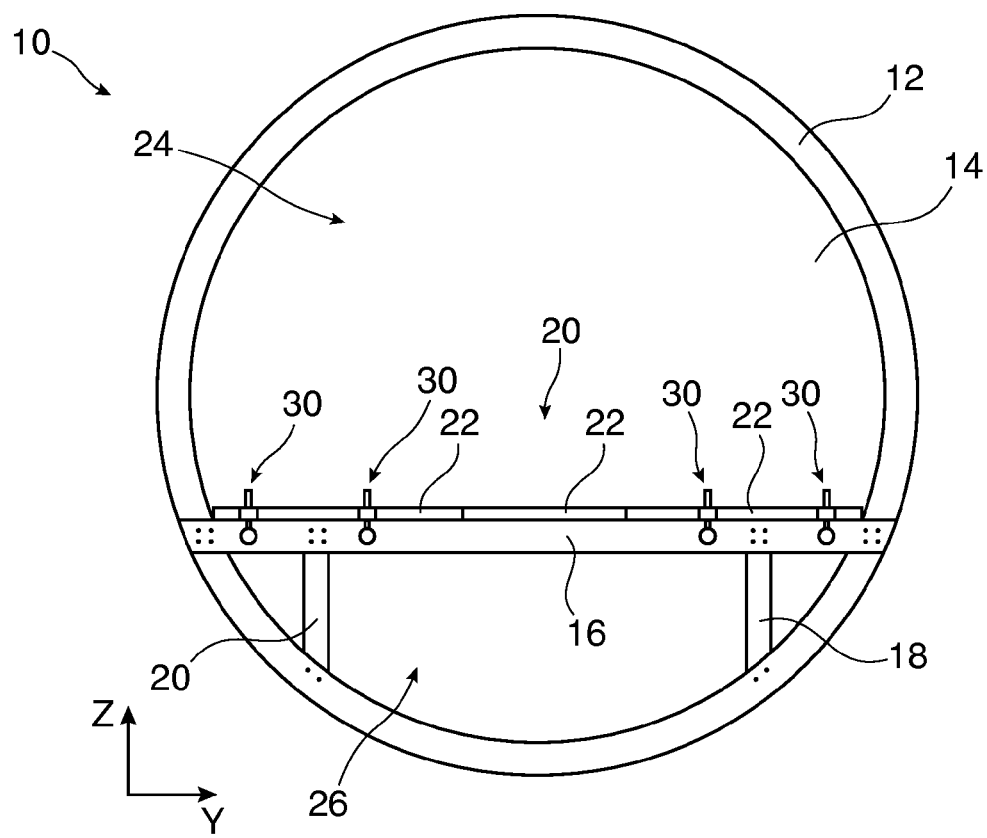
FIG. 1 shows a cross-sectional view of an aircraft according to various embodiments of the present disclosure.

FIG. 1 shows a cross section through an aircraft 10, such as a plane, which has a rib or frame 12 surrounding an interior 14 of the aircraft 10. A cross beam 16, which runs in a horizontal direction Y, is attached to the rib 12, for example by means of rivets. The cross beam 16 may be supported by vertical struts 18, running in a vertical direction Z, which also may be attached to the rib 12 and the cross beam 16 by means of rivets.

A floor 20 is lying on the cross beam 16. For example, the floor may be a cabin floor of the aircraft 10. The floor 20 comprises floor panels 22, which may be attached to each other for forming the floor 20. The floor panels 22 may comprise a core with a honeycomb structure or a fibre-reinforced foam core, for example as described in DE 10 2005 024 408 A1.

The floor 20 (and the cross beam 16) separate the interior 14 of the aircraft 10 into an upper area 24, which may be a passenger area 24 and a lower area 26, which may be a cargo area 26.

Figure 3:
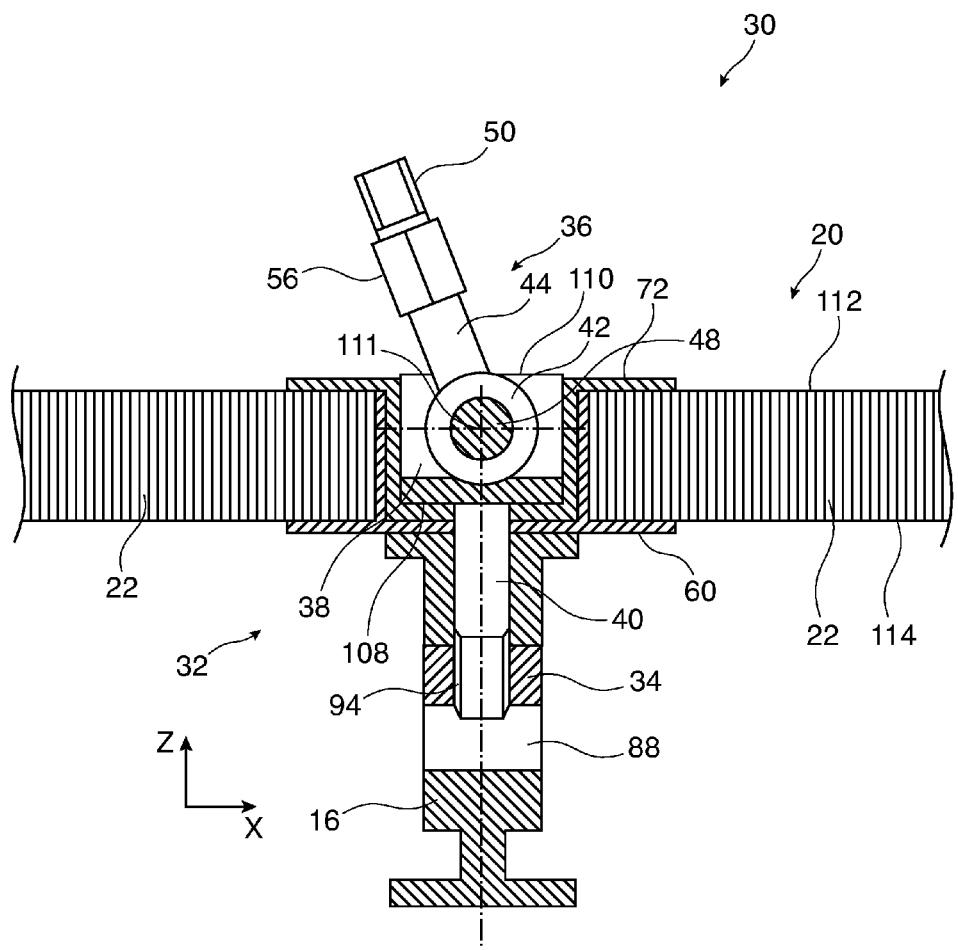
FIG. 3 shows a cross-sectional view of a fastening arrangement according to various embodiments.

The floor 20 and in particular floor panels 22 are attached to the cross beam 16 with a plurality of (equally designed) fastening arrangements 30, one of which is shown in detail in FIG. 3.

Figure 2:
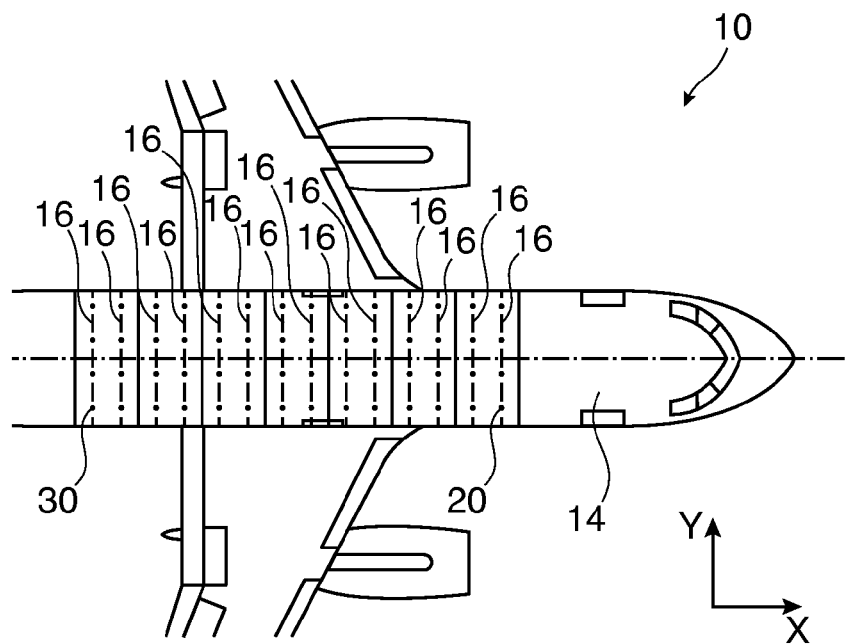
FIG. 2 shows an elevational view on the aircraft of FIG. 1.

FIG. 2 shows the aircraft from FIG. 1 from above. As indicated in FIG. 2, the aircraft 10 has a plurality of cross beams 16 that support the floor 20 and that extend in a cross direction Y orthogonal to a longitudinal direction X of the aircraft 10.

The floor 20 is attached to the cross beams 16 via the fastening arrangements 30, which may be used for attaching further elements of the interior of the aircraft 10 to the cross beams 16. The further elements, like seat rows, monuments, galleys, toilets, etc. may be part of the secondary structure of the aircraft. The cross beams 16, the ribs 12 as well as the skin of the aircraft 10 are part of the primary structure of the aircraft 10.

In such a way, the fastening arrangements 30 are used for attaching the floor 20 to the aircraft 10, in particular to the cross beams 16 and for transferring loads from the elements of the secondary structure into the primary structure.

When the elements of the primary structure are seats or seat rows, the cross beams 16 may have a distance in the longitudinal direction X such that a seat or a seat row may be attached to two neighboring cross beams 16 with at least two fastening arrangements 30 distanced in the X-direction.

FIG. 3 shows a cross-sectional view of a fastening arrangement 30, which is cut in a plane orthogonal to the Y-direction.

The fastening arrangement 30 comprises a fork bolt 32 that is connected to the cross beam 16 via barrel nut 34 and a lug bolt 36 that is rotary connected to the fork bolt 32. The fork bolt 32 comprises a head 38 and a foot 40, which is a substantially cylindrical rod that is connected to the head. The head 38 is used for attaching the lug bolt 36 and pressing the floor panel 22 to the cross beam 16. The foot 40 may be screwed into the barrel nut 34.

Figure 4:
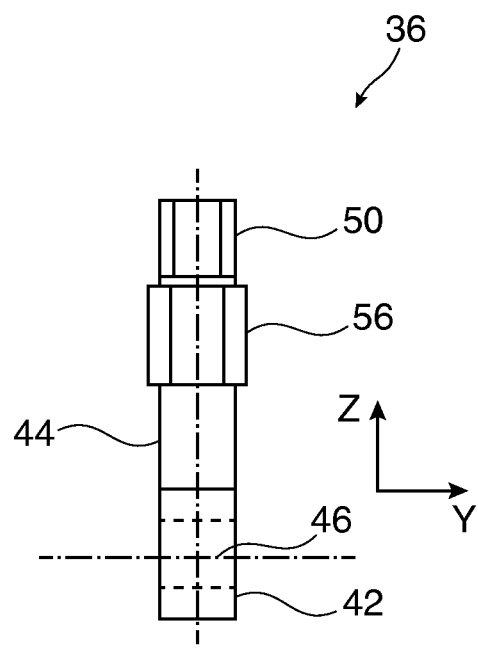
FIG. 4 shows a side view of a lug bolt for a fastening arrangement according to various embodiments.

FIG. 4 shows a side view of the lug bolt 36, which comprises an eye 42 and a substantially cylindrical rod 44, which is connected to the eye 42. The lug bolt 36 may be a one piece member. The eye 42 is a cylindrical ring with an opening 46 for receiving a fastening bolt 48 that is shown in more detail in FIG. 12.

The fastening bolt 48, which is attached to the fork bolt 32, and the eye 42 form a hinge such that the lug bolt 36 may be rotated or hinged around the fastening bolt 48 in the X-direction.

The cylindrical rod 44 or foot 44 of the lug bolt 36 comprises a thread 50 at an end, which may be used for attaching an attachment element 52. However, the lug bolt 36 may be a part of the secondary structure of the aircraft 10.

Between the thread 50 and the eye 42, the lug bolt 36 has a wrench engagement section 56, for example a hexagonal bolt 56. With the wrench engagement section 56, the fork bolt 32 may be screwed into the barrel nut 34 as will be explained with respect to FIG. 13.

Figure 5:
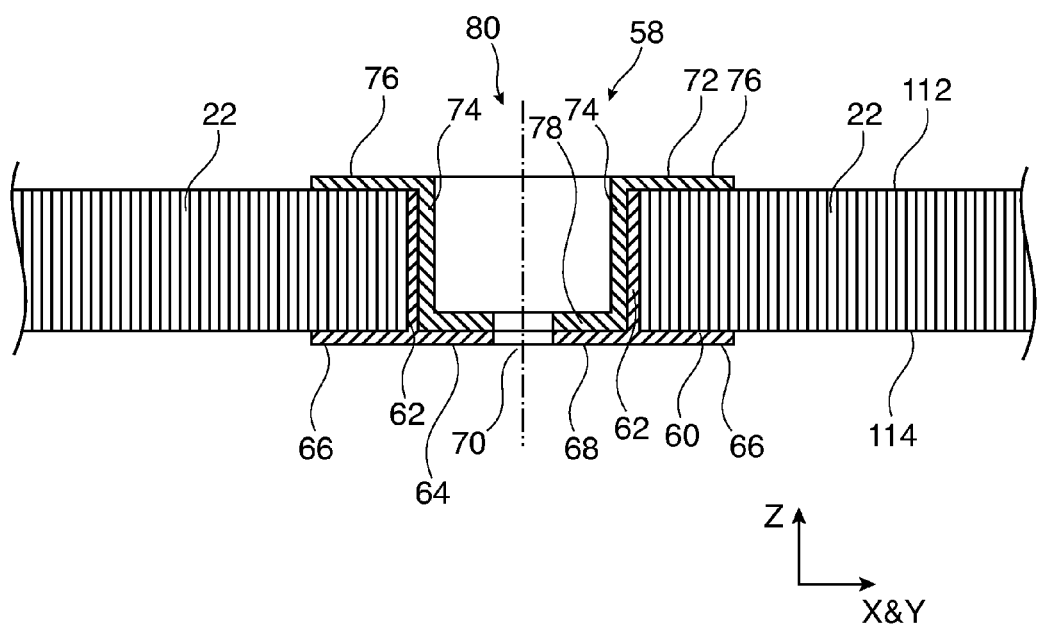
FIG. 5 shows a cross-sectional view of a floor panel for a fastening arrangement according to various embodiments.

FIG. 5 shows a cross-sectional view of a part of the floor panel 22. The floor panel 22 has a cylindrical through-hole 58, which contains a lower or inner insert 60 that is plugged into the through-hole 58 via a cylindrical wall 62. The lower insert has a flat member 64 that is attached to the cylindrical wall 62 and that is deposited on the floor panel 22. The flat member 64 forms a flange 66 touching the material of the floor panel and a bottom wall 68 forming the bottom of a cup-shaped section of the lower insert 60. The bottom wall 68 has an opening 70 through which the foot 40 of the fork bolt 32 may be plugged.

An upper insert 72 is plugged into the lower insert 60 with a cylindrical wall 74. The upper insert 72 comprises a flange 76 attached to the cylindrical wall 74 opposite to the flange 66 of the lower insert 60 and a flat bottom wall 78 sitting on the bottom part 68 of the lower insert 60 and forming a cup-shaped section of the upper insert 72. Similarly to the bottom wall 68, the bottom wall 78 has an opening through which the foot 40 of the fork bolt 32 may be plugged.

The flanges 66, 76 may be used for bonding the inserts 60, 72 to the material of the floor panel 22 and may be seen as a bonding area. The inserts 60, 72 may be manufactured from a material that is stiffer than the material of the floor panel 22 to provide a stiff grounding for the attachment arrangement 30.

Figure 6:
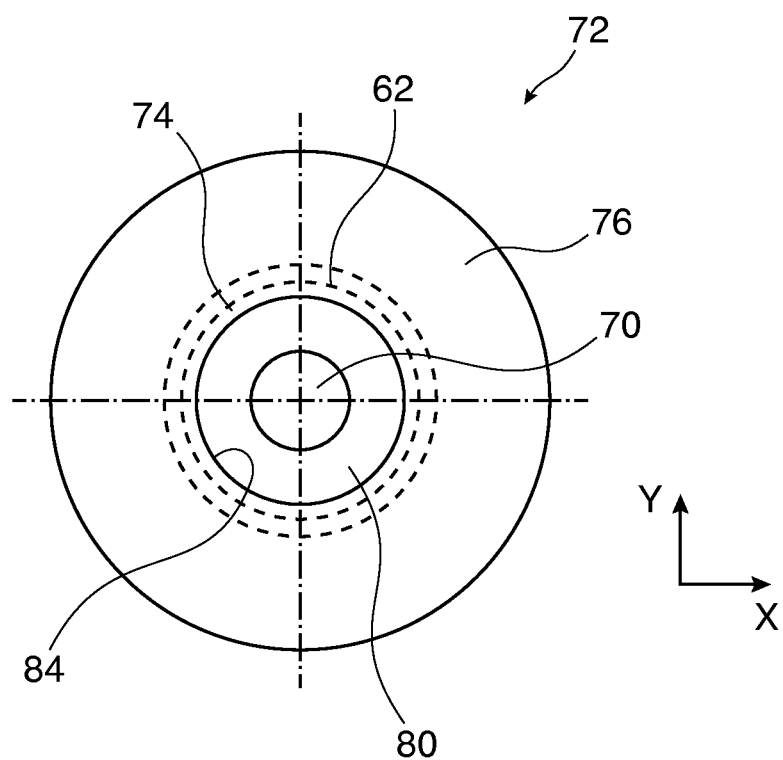
FIG. 6 shows an elevational view on an insert for a fastening arrangement according to various embodiments.

FIG. 6 shows an elevational view of the upper insert 72. The cylindrical wall 74 and the bottom wall 78 form a substantially cylindrical opening 80 in the floor panel 22 that is adapted for receiving the head 38 of the fork bolt 32. As may be best seen from FIG. 13, the head 38 of the fork bolt 32 has an outer profile 82 that fits into an inner profile 84 of the opening 80 such that forces may be transferred between the head 38 and the floor panel 22 and such that the head 38 is rotatable in the opening 80.

Figure 7:
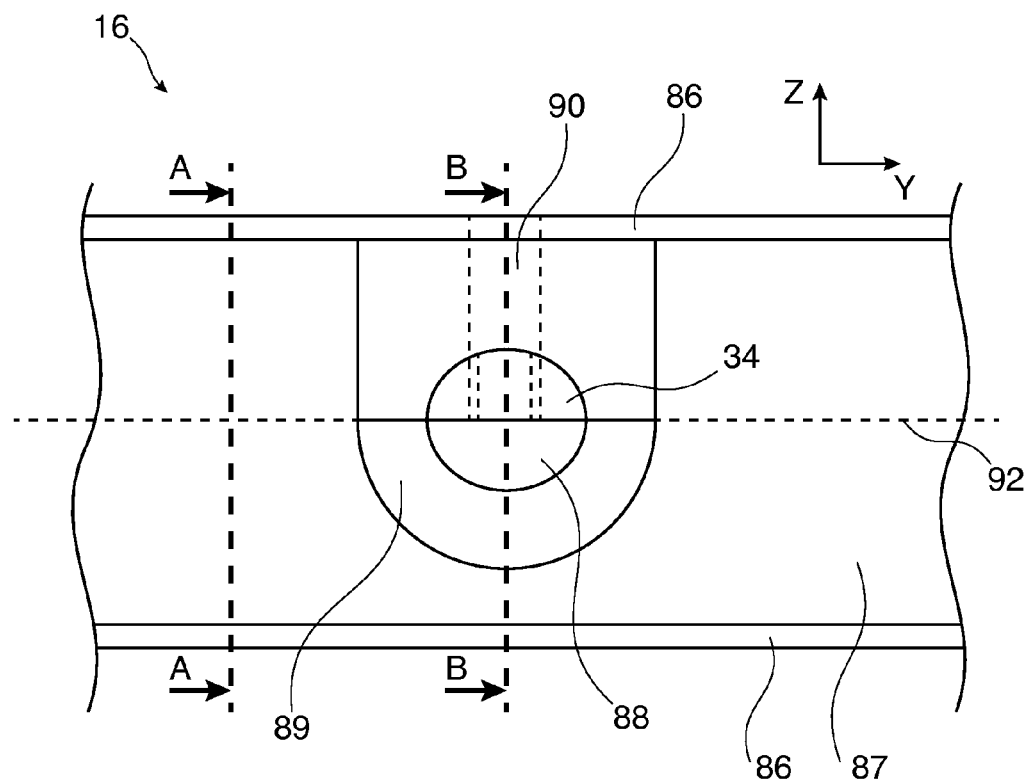
FIG. 7 shows a side view of a cross beam for a fastening arrangement according to various embodiments.
Figures 8, 9:
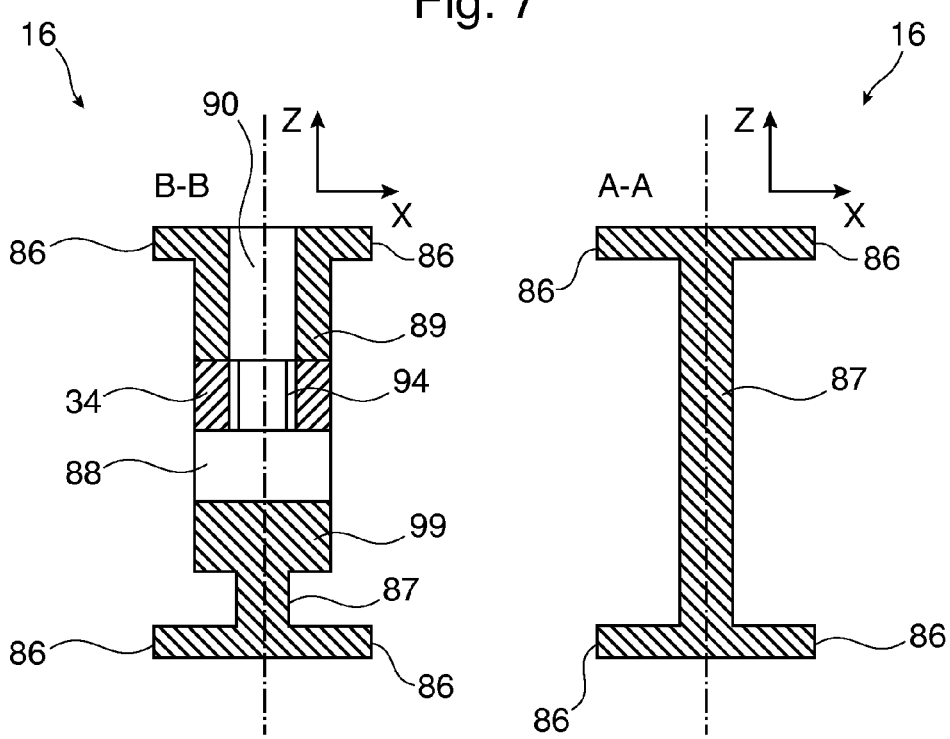
FIG. 8 shows a first cross-sectional view of the cross beam of FIG. 7.
FIG. 9 shows a second cross-sectional view of the cross beam of FIG. 7.

FIG. 7 shows a side view of the cross beam 16. FIG. 8 shows a cross-sectional view of the cross beam 16 along the line B-B of FIG. 7 and FIG. 9 shows a cross-sectional view through the cross beam 16 along the line A-A of FIG. 7. The cross beam 16 is shaped as double-T-beam with flanges 86 that may be rather small, since the cross beam 16 may be a weak, resilient cross beam that is adapted for balancing forces from the secondary structure attached to the lug bolt 28 conveying and for conveying these forces into the secondary structure. The flanges 86 may be connected by a central member 87 that runs substantially orthogonal to the flanges 86.

The cross beam 16 has a substantially cylindrical opening 88 for receiving the barrel nut 34, which runs completely through the cross beam 16 in the X-direction and a cylindrical opening 90 for receiving the foot 40 of the fork bolt 32, which runs in the Z-direction from one side of the cross beam 16 to the opening 88. The opening 88 is positioned such that its center is on the neutral fibre 92 of the cross beam 16, for example the middle of the cross beam 16, when the cross beam 16 is symmetric.

The barrel nut 34 may have the form of a half-cylinder and has an inner thread 94 into which the foot 38 of the fork bolt 32 may be screwed for attaching the fork bolt 32 to the cross beam 16.

In the area of the openings 88, 90, the cross beam 16 may be thicker as outside of this area. As shown in FIGS. 7 and 8, the central member 87 of the cross beam may have a thickened part 89 that surrounds the opening 88.

Figure 10:
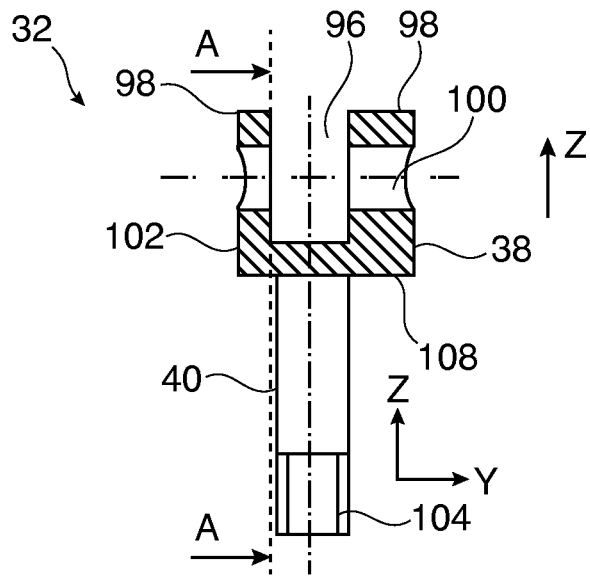
FIG. 10 shows a cross-sectional side view of a fork bolt for a fastening arrangement according to various embodiments.
Figure 12:
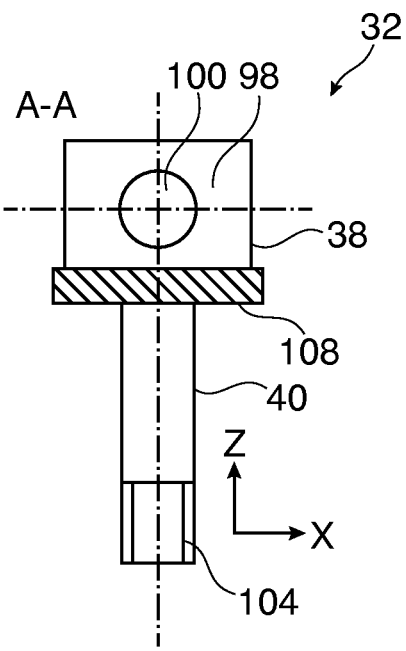
FIG. 12 shows a further cross-sectional side view of the fork bolt of FIG. 10.

FIGS. 10 and 12 show cross-sectional side views of the fork bolt 32 from different directions.

Figure 11:
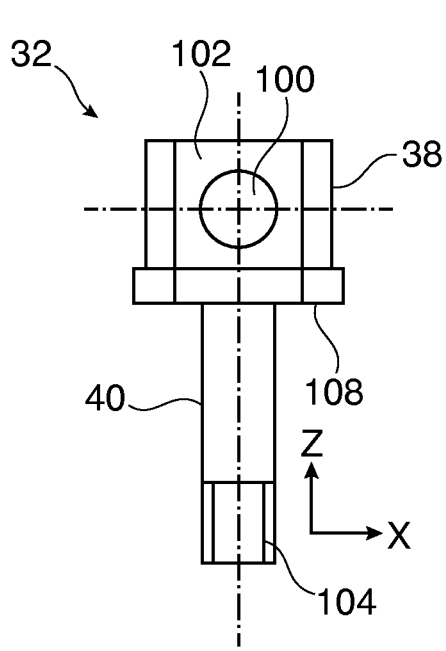
FIG. 11 shows a side view of the fork bolt of FIG. 10.
Figure 13:
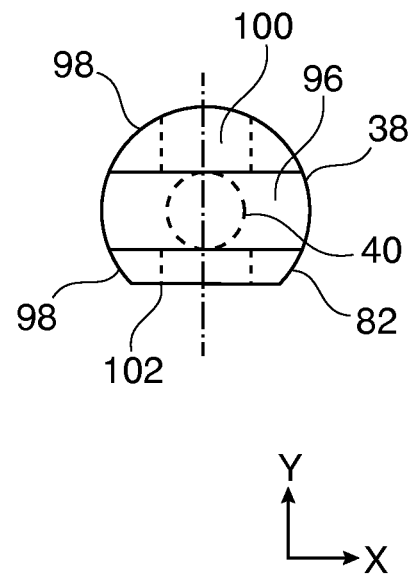
FIG. 13 shows an elevational view of the fork bolt of FIG. 10.

FIG. 11 shows a side view of the fork bolt 32. FIG. 13 shows an elevational view on the fork bolt 32. The fork bolt 32 has a head 38 and a foot 40. The fork bolt 32 may be a one piece member.

The fork bolt 32 has a head 38 with a substantially cylindrical outer profile 82 that is interrupted by a slit 96 that forms two fork rakes 98 in the head 38. The slit 96 is adapted for receiving the eye 42 of the lug bolt 36. Orthogonal to the slit 98, an opening 100 runs through the head 38 that receives the fastening bolt 48 shown in FIG. 12. The slit 96, as well as the eye 42, has parallel side walls.

At one side 102, the head 38 is flat. The side 102 is used for supporting the fastening bolt 48.

The foot 40 of the fork bolt 32 is a substantially cylindrical rod with a thread 104 at one end that may be screwed into the thread 94 of the barrel nut 34.

Figure 14:
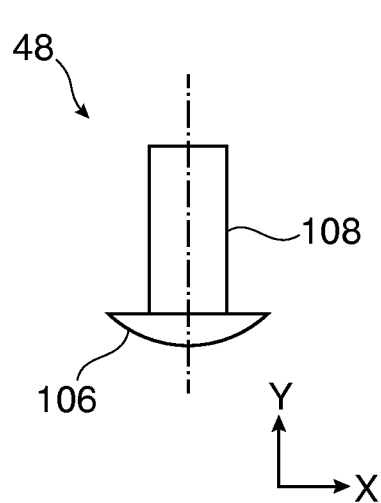
FIG. 14 shows an elevational view of a fastening bolt for a fastening arrangement according to various embodiments.
Figure 15:
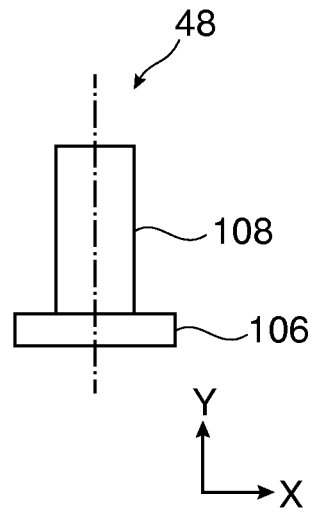
FIG. 15 shows a side view of the fastening bolt of FIG. 14.

FIG. 14 shows an elevational view on the fastening bolt 48 and FIG. 15 shows a side view of the fastening bolt 48. The fastening bolt 48 has a rod-like foot 104 to be received by the opening 100 and a head 106 shaped as a cylinder segment that completes the missing cylindrical segment of the head 32 due to the flat side 102. When the fastening bolt 48 is plugged into the head 32, the outer profile of the combination 48, 32 has a complete cylindrical outer profile that fits into the opening 60 of the floor panel.

Figure 16:
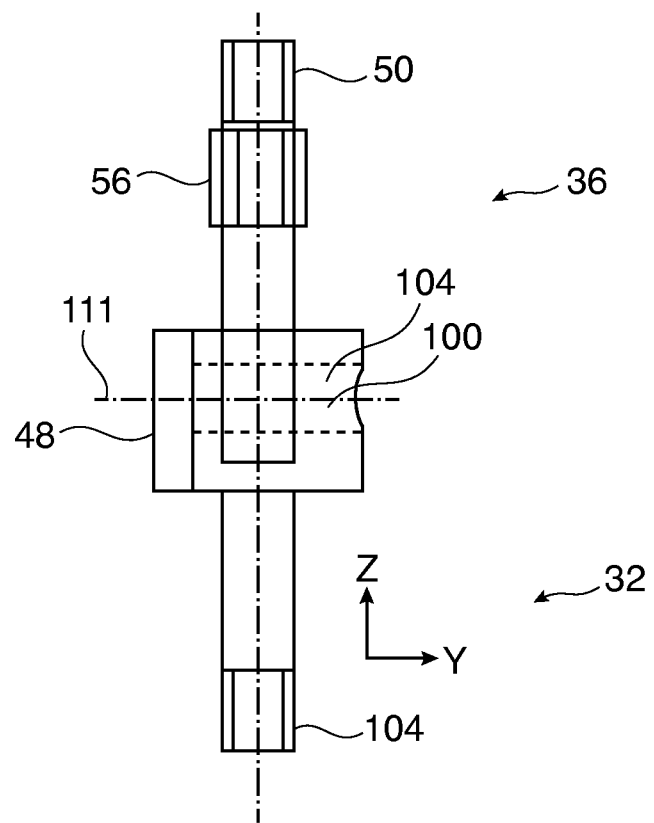
FIG. 16 shows a side view of the lug bolt of FIG. 4 attached to the fork bolt of FIG. 10.

FIG. 16 shows a side view of the fork bolt 32 connected to the lug bolt 36 via the fastening bolt 34. Since the head 38 of the fork bolt 32 is rotatable in the opening 80 of the floor panel 22, the fork bolt 32 may be screwed into the barrel nut 34 by rotating the lug bolt 36, which may be done by using the wrench engagement section 56 of the lug bolt 36.

Also with respect to FIG. 3, when the fork bolt 32 is screwed into the cross beam 16, the lower side or surface 108 of the head 32 is pressed onto the bottom wall 68, 78 of the inserts 60, 72 and the floor panel 22 is attached to the cross beam 16.

The upper side or surface 110 of the head 38 is substantially flush with the flange 76 of the insert 72 and/or the upper surface 112 of the floor panel 22.

The hinge axis 111 of the lug bolt 32 (which is defined by the fastening bolt 104 and the opening 100) is situated in the opening 60 in the floor panel, i.e. between the upper surface 112 and a lower surface 114 of the floor panel 22.

With the fastening arrangement 30, the secondary structure of the aircraft 10 may be mechanically decoupled from the primary structure. The hinge connection of the lug bolt 32 to the fork bolt provides a moment-free load introduction in the floor panel 22. Since the head 38 (together with the fasting bolt 48) fits into the insert 72, a load in the X-direction or the Y-direction is introduced via the head 38 into the stiff inserts 72, 60 and then into the floor panel 22. A load in the Z-direction is introduced into the cross beam 16 via the attachment of the foot 38 of the fork bolt 32 and the barrel nut 34. Since the cross beam 16 may be a rather weak cross beam 16, the load introduction into the primary structure may be nearly moment-free.

Figures 17, 18:
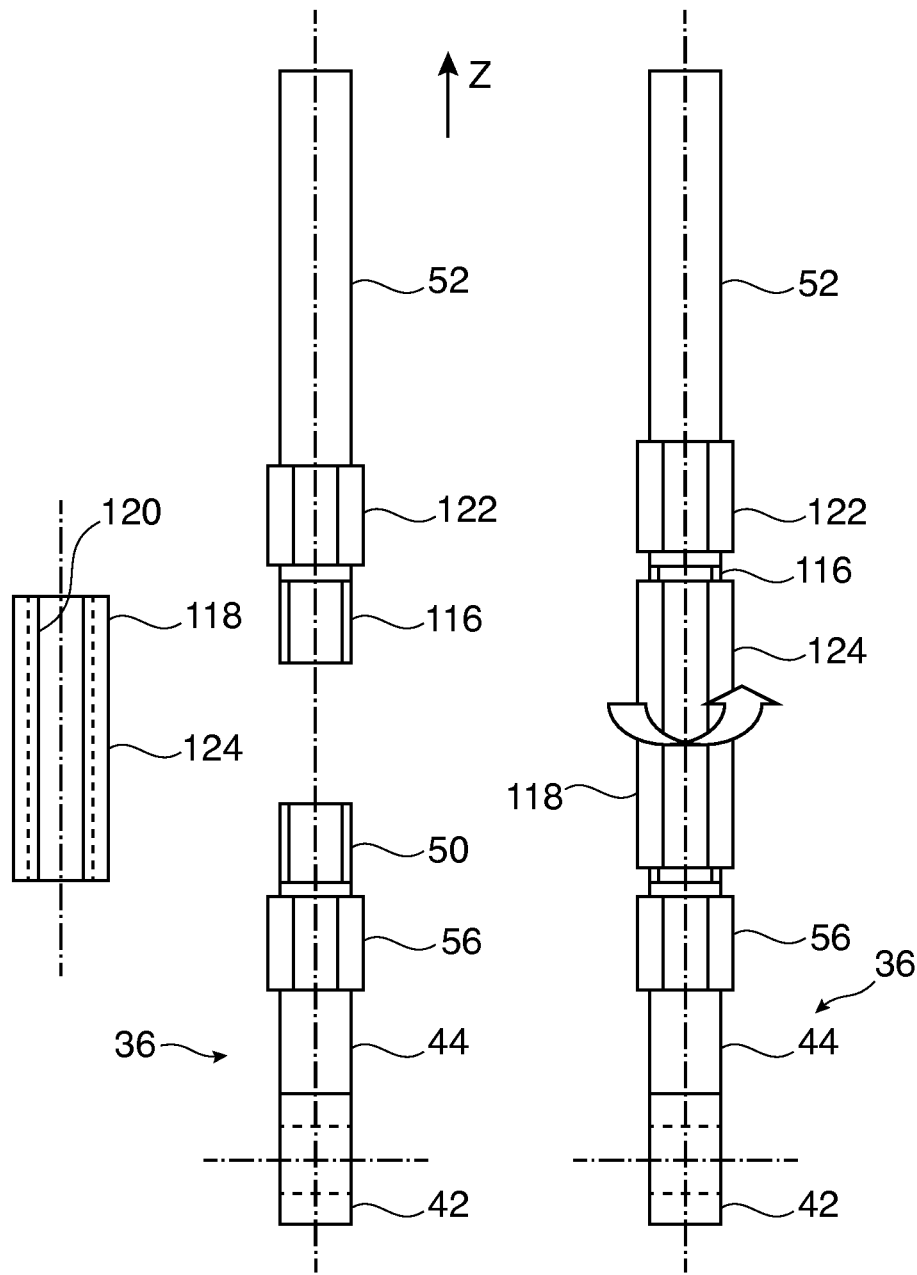
FIG. 17 shows a side view of the lug bolt of FIG. 4 and an attachment element for a fastening arrangement according to various embodiments.
FIG. 18 shows a side view of the lug bolt of FIG. 4 and the attachment element of FIG. 14 attached to each other.
Figure 19:
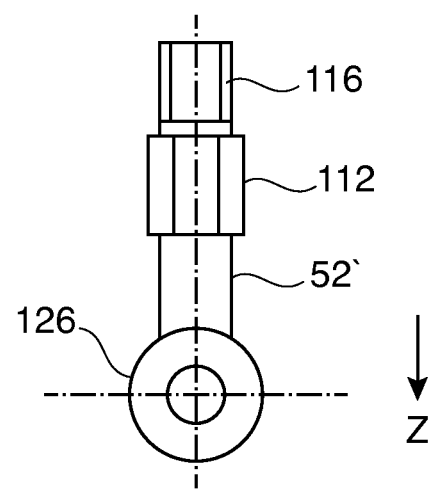
FIG. 19 shows a side view of an attachment element for a fastening arrangement according to various embodiments.

FIGS. 17 to 19 show possibilities how elements or members of the secondary structure may be attached to the lug bolt 36. However, as already described, it is possible that the lug bolt 36 is part of the respective element of the secondary structure, i.e. is not disconnectable from the element.

FIG. 17 is a side view of a lug bolt 36 and an attachment element 52 that may be part of an element of the secondary structure. For example, the element 52 is connected to a seat or a seat row.

At an end, the attachment element 52 element has an outer thread 116 that may be screwed into a bushing 118 with an inner thread 120. As indicated in FIG. 18, the bushing 118 may also be screwed on the thread 50 of the lug bolt 36. The thread 116 (with a left turning thread) may be threaded in the opposite direction as the thread 50 (with a right turning thread) of the lug bolt 32 such that the bushing 118 may be very simple constructed.

Like the lug bolt 32, the attachment element 52 may have a wrench engagement section 122. Also the bushing 118 may have a wrench engagement section 124. Both engagement section 122, 124 may be hexagonal nuts.

FIG. 19 is a side view of an alternative embodiment of an attachment element 52'. At an end opposite to the thread 116, the attachment element 52 may have a lash ring 126, for example for connecting ropes, cables and/or chains.

Figure 20:
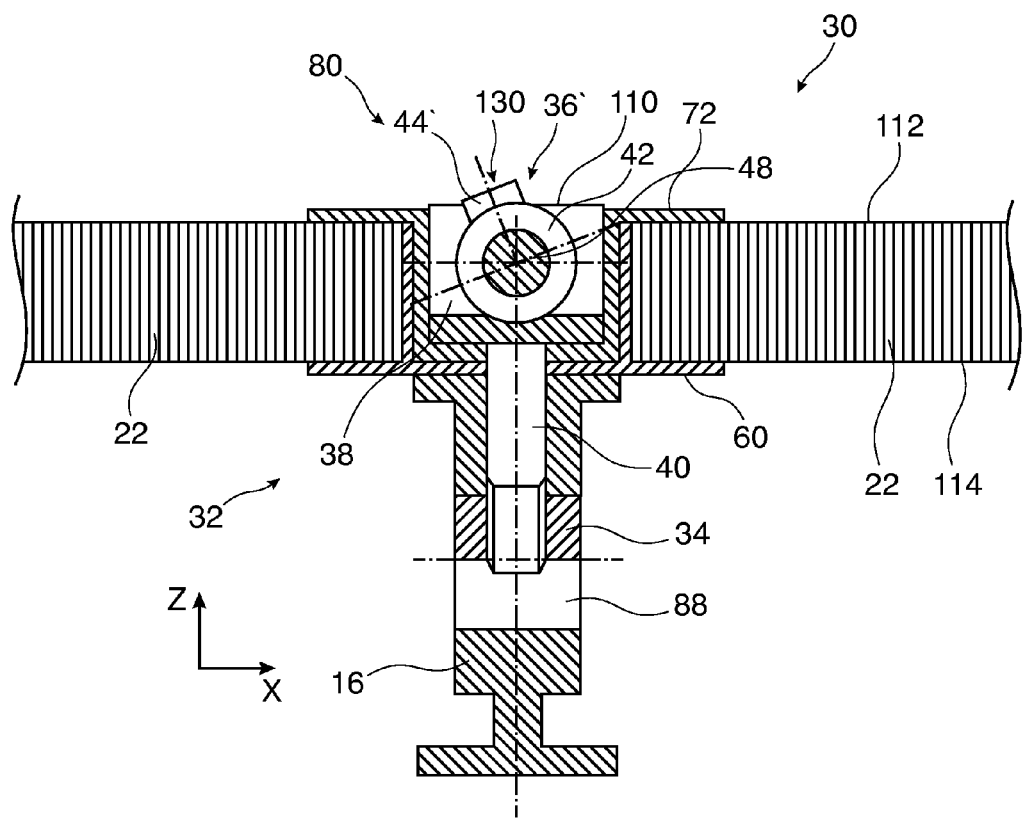
FIG. 20 shows a cross-sectional view of a fastening arrangement according to another exemplary embodiment of the present disclosure.

FIG. 20 shows a fastening attachment 30 similar to FIG. 3 with an alternative embodiment of a lug bolt 36'. The lug bolt 36' has a foot 44' that may be rotated into the opening 80 via the hinge movement of the lug bolt 36'. For example, the foot 44' may be shorter than a distance between the eye 42 of the lug bolt 36' and the inner wall of the opening 80. In such a way, the lug bolt 38' can be rotated into the insert 72 to create a flat floor 20.

The foot 44' may be adapted for attaching an element of the secondary structure via a snap and click connection to the lug bolt 36'. For example, the foot 44' may have an opening 130 for receiving a snap and click bolt.

Figure 21:
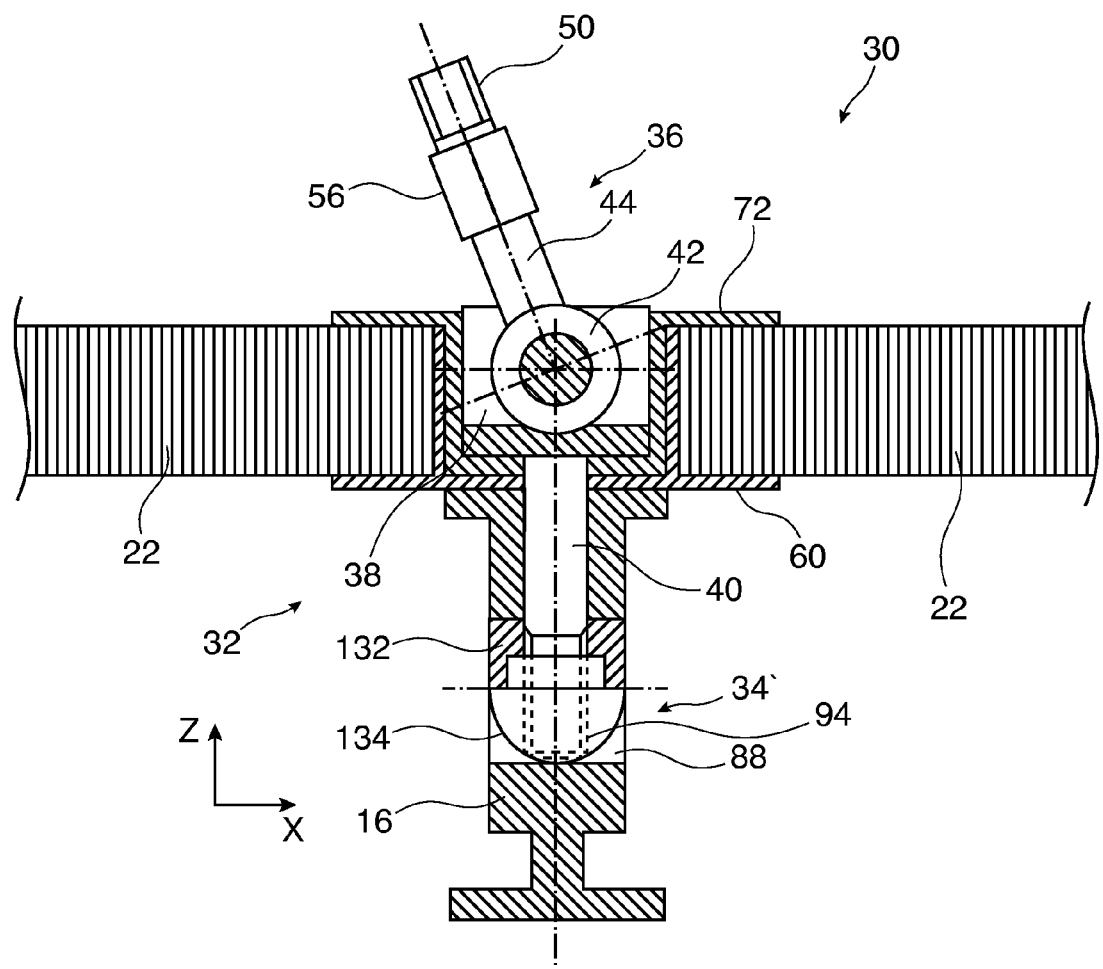
FIG. 21 shows a cross-sectional view of a fastening arrangement according to one of various embodiments of the present disclosure.

FIG. 21 shows a fastening attachment 30 similar to FIG. 3 with an alternative embodiment of a barrel nut 34'. The barrel nut 34 shown in the previous figures is a one piece member with an inner thread 94 for attaching the fork bolt 32.

The barrel nut 34 is a two-piece member with a first part 132 that may have a half-cylinder form or a partially cylinder form fitting into the opening 88 in the cross beam 16 and a second part (or nut part) 134 that may be plugged into the first part 132. The first part 132 has an opening (without a thread) for receiving the foot 40 of the fork bolt 32. The second part 134 has a thread 94 for attaching the fork bolt 32.

Figure 22:
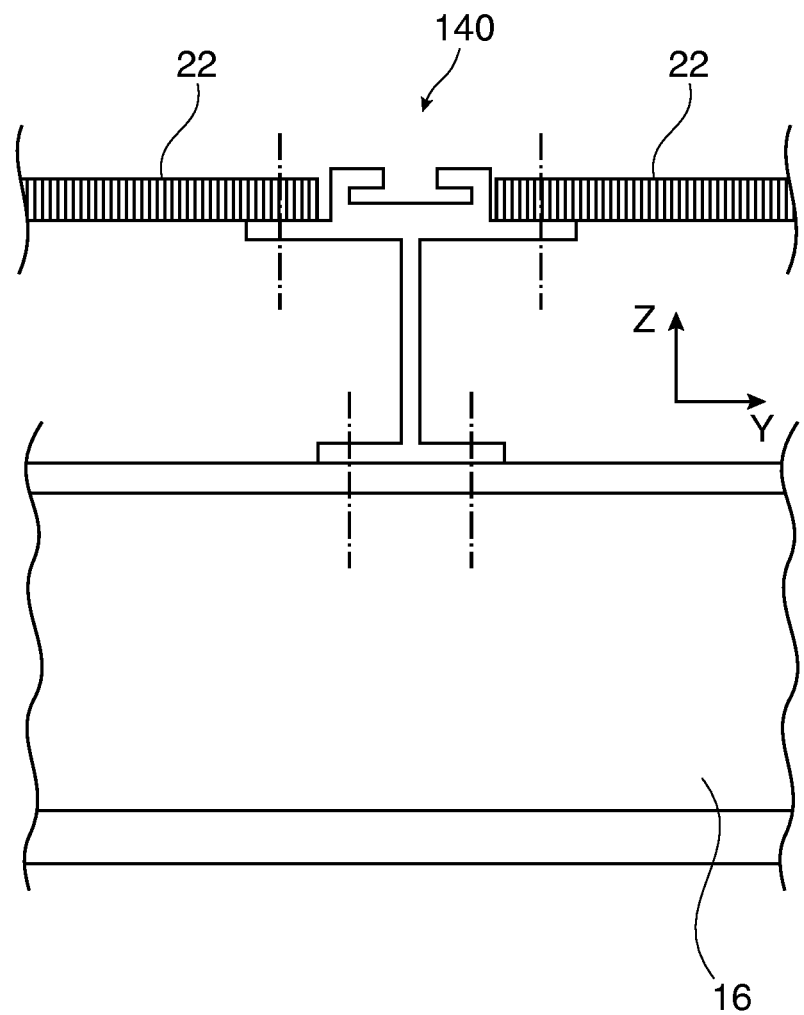
FIG. 22 shows a cross-sectional view of a standard seat rail attachment.

FIG. 22 shows a standard seat rail attachment with floor panels 22 and cross beam 16 that comprises a standard seat rail 140.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A fastening arrangement for attaching a floor to a support structure, the fasting arrangement comprising:
   at least one cross beam;
   a floor panel of the floor deposited on the at least one cross beam;
   a fork bolt attached to the at least one cross beam via a barrel nut, the fork bolt having a foot with a thread to be screwed into a thread of the barrel nut; and
   a lug bolt rotatably connected to the fork bolt and adapted for attaching an attachment element to the at least one cross beam,
   wherein the fork bolt has a head with a slit for accommodating an end of the lug bolt, such that the lug bolt is rotatable in the direction of the slit,
   wherein the floor panel has an opening for accommodating the head of the fork bolt, such that the floor panel is attached to the at least one cross beam by the head of the fork bolt, and
   wherein the head of the fork bolt is rotatable in the opening of the floor panel for screwing the fork bolt into the barrel nut by rotating the lug bolt.

2. The fastening arrangement of claim 1,
   wherein the lug bolt comprises an end with a thread for attaching the attachment element to the lug bolt.

3. The fastening arrangement of claim 2, further comprising:
   the attachment element including a thread in an opposite direction of the thread of the lug bolt, such that the attachment element is fastenable to the lug bolt with a bushing having one inner thread.

4. The fastening arrangement of claim 1,
   wherein the lug bolt comprises an end that is rotatable into the opening of the floor panel.

5. The fastening arrangement of claim 1,
   wherein the head of the fork bolt comprises an outer profile that fits into an inner profile of the opening in the floor panel such that the head of the fork bolt is adapted for transferring a force acting on the head to the inner profile of the opening.

6. The fastening arrangement of claim 1,
   wherein the opening in the floor panel has a circular inner profile; and
   wherein the head of the fork bolt has an at least partially circular outer profile.

7. The fastening arrangement of claim 1,
   wherein an upper surface of the fork bolt is flush with an upper surface of the floor panel.

8. The fastening arrangement of claim 1, further comprising:
   a fastening bolt for rotatably attaching the lug bolt to the fork bolt,
   wherein the lug bolt comprises an eye to be accommodated in the slit of the head of the fork bolt, the eye having an opening for accommodating the fastening bolt; and
   wherein the fastening bolt has a head that, when the fastening bolt is plugged into the head of the fork bolt, completes an outer profile of the fork bolt to a circular outer profile.

9. The fastening arrangement of claim 1,
   wherein a hinge axis between the fork bolt and the lug bolt is between an upper surface of the floor panel and a lower surface of the floor panel.

10. The fastening arrangement of claim 1,
   wherein the floor panel comprises a second cup-shaped insert for accommodating the first cup-shaped insert.

11. The fastening arrangement of claim 10,
wherein the first cup-shaped insert has a flange that surrounds the first cup-shaped insert and that covers a part of the material of the floor panel.

12. The fastening arrangement of claim 10,
wherein the first cup-shaped insert has a bottom that is flush with a lower surface of the floor panel.

13. The fastening arrangement of claim 10,
wherein the at least one cross beam has an opening for accommodating the barrel nut, and an opening for accommodating the foot of the fork bolt; and
wherein the opening for the barrel nut is situated at a neutral fibre of the at least one cross beam.

14. The fastening arrangement of claim 10,
wherein the floor panel comprises a second cup-shaped insert for accommodating the first cup-shaped insert.

15. The fastening arrangement of claim 14,
wherein the second cup-shaped insert has a flange that surrounds the insert and that covers a part of the material of the floor panel.

16. The fastening arrangement of claim 14,
wherein the second cup-shaped insert has a bottom that is flush with a lower surface of the floor panel.

17. An aircraft, comprising:
a plurality of cross beams;
a floor deposited on the plurality of cross beams;
a plurality of fastening arrangements attaching the floor to the plurality of cross beams with each of the plurality of fasting arrangements comprising:
at least one of the plurality of cross beams;
a floor panel of the floor deposited on the at least one of the plurality of cross beams;
a fork bolt attached to the at least one of the plurality of cross beams via a barrel nut, the fork bolt having a foot with a thread to be screwed into a thread of the barrel nut; and
a lug bolt rotatably connected to the fork bolt and adapted for attaching an attachment element to the at least one of the plurality of cross beams,
wherein the fork bolt has a head with a slit for accommodating an end of the lug bolt, such that the lug bolt is rotatable in the direction of the slit,
wherein the floor panel has an opening for accommodating the head of the fork bolt, such that the floor panel is attached to the at least one of the plurality of cross beams by the head of the fork bolt, and
wherein the head of the fork bolt is rotatable in the opening of the floor panel for screwing the fork bolt into the barrel nut by rotating the lug bolt.

18. The fastening arrangement of claim 1,
wherein the barrel nut has a first part fitting into an opening in the at least one cross beam and a second part with the thread for attaching the fork bolt.

19. The fastening arrangement of claim 1,
wherein the lug bolt comprises an end with a snap-and-click connection for attaching the attachment element to the lug bolt.

20. The aircraft of claim 17,
wherein the lug bolt comprises an end with a thread for attaching the attachment element to the lug bolt.

\* \* \* \* \*